US012640997B2

(12) United States Patent (10) Patent No.: US 12,640,997 B2

Alasti et al. (45) Date of Patent: May 26, 2026

(54) PROVIDING ACCESS ON-DEMAND TO CELLULAR WIRELESS TELECOMMUNICATION NETWORK FUNCTIONALITY

(71) Applicant: Boost SubscriberCo L.L.C., Englewood, CO (US)

(72) Inventors: Mehdi Alasti, Reston, VA (US); Ash Khamas, Goffstown, NM (US); Kazi Bashir, Lewisville, TX (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 595 days.

(21) Appl. No.: 18/084,280

(22) Filed: Dec. 19, 2022

(65) Prior Publication Data

US 2024/0205104 A1 Jun. 20, 2024

(51) Int. Cl.
*H04L 41/40* (2022.01)
*H04W 84/04* (2009.01)

(52) U.S. Cl.
CPC .......... *H04L 41/40* (2022.05); *H04W 84/042* (2013.01)

(58) Field of Classification Search
CPC . H04W 28/0967; H04W 28/26; H04W 16/14; H04W 28/0846; H04W 24/02; H04W 16/10; H04W 88/085
See application file for complete search history.

(56) References Cited

U.S. PATENT DOCUMENTS

| | | | |
|---|---|---|---|
| 2017/0164215 A1* | 6/2017 | Chen ..................... | H04W 24/02 |
| 2021/0029562 A1 | 1/2021 | Notargiacomo et al. | |
| 2021/0168027 A1* | 6/2021 | Parulkar ............... | G06F 9/4856 |
| 2023/0057469 A1 | 2/2023 | Hoole et al. | |
| 2023/0254702 A1* | 8/2023 | Damnjanovic ... | H04W 28/0967 |
| | | | 455/501 |

OTHER PUBLICATIONS

Mehdi Alasti et al., "Sharing a Cellular Wireless Telecommunication Network Radio Unit (RU) By Multiple Mobile Network Operators," U.S. Appl. No. 18/070,105, filed Nov. 28, 2022. (38 Pages).

Giupponi, L., et al., "Blockchain-Enabled Network Sharing for O-RAN in 5G and Beyond", IEEE Network, vol. 36, No. 4, 2022, pp. 218-225.

(Continued)

*Primary Examiner* — Mahran Abu Roumi

(74) *Attorney, Agent, or Firm* — Kipman T. Werking; Frontier IP Law PLLC

(57) ABSTRACT

Embodiments an enterprise leasing from an access on-demand (AoD) provider access to radio unit (RU) and spectrum having specific bandwidth. The enterprise instantiates some of their network functions (NFs) to reside in the AoD private cloud and other NFs in a private or public cloud provided by a could service provider of their choice. The enterprise leases their desired NFs, spectrum and transport (all as a service) to build their 5G network. The system of the AoD provider also offers the enterprises transport/connectivity to other public/private clouds or to the Internet and offers management services to the enterprises.

13 Claims, 10 Drawing Sheets

(56)                          References Cited

OTHER PUBLICATIONS

Harutyunyan, D., et al., "Flex5G: Flexible Functional Split in 5G Networks", IEEE Transactions on Network and Service Management, vol. 15, No. 3, Sep. 1, 2018, pp. 961-975.

International Search Report received for PCT Patent Application No. PCT/US23/079231, mailed on Mar. 5, 2024, 4 pages.

Li, X., et al., "End-to-End Network Slicing in Radio Access Network, Transport Network and Core Network Domains", IEEE Access, vol. 8, Feb. 2020, pp. 29525-29537.

Nour, B., et al., "A Blockchain-Based Network Slice Broker for 5G Services", IEEE Networking Letters, vol. 1, No. 3, Sep. 2019, 4 pages.

* cited by examiner

100

Mobile Network Operator
A
(Enterprise A)

Geographic Area A
Bandwidth A
Timeframes A

104a

Shared Radio Unit
(RU)

106

AoD Private Cloud

108

Mobile Network Operator
B
(Enterprise B)

Geographic Area B
Bandwidth B
Timeframes B

104b

Access on Demand
(AOD) Provider

114

Mobile Network Operator
N
(Enterprise N)

Geographic Area N
Bandwidth N
Timeframes N

104n

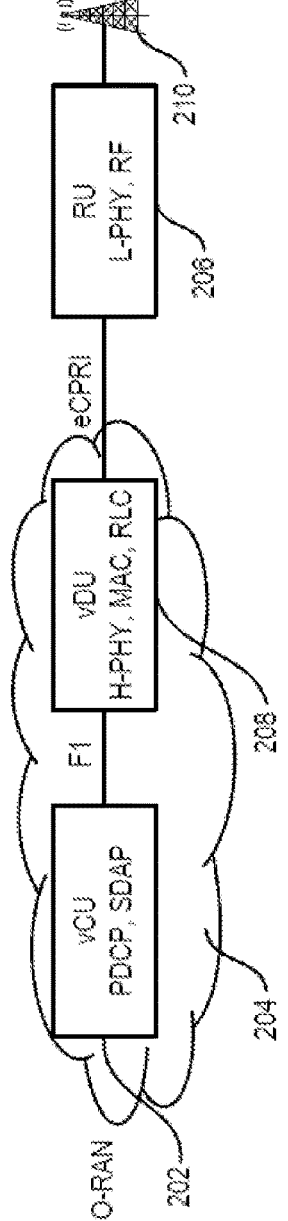
*Fig. 2*

Figure 3:
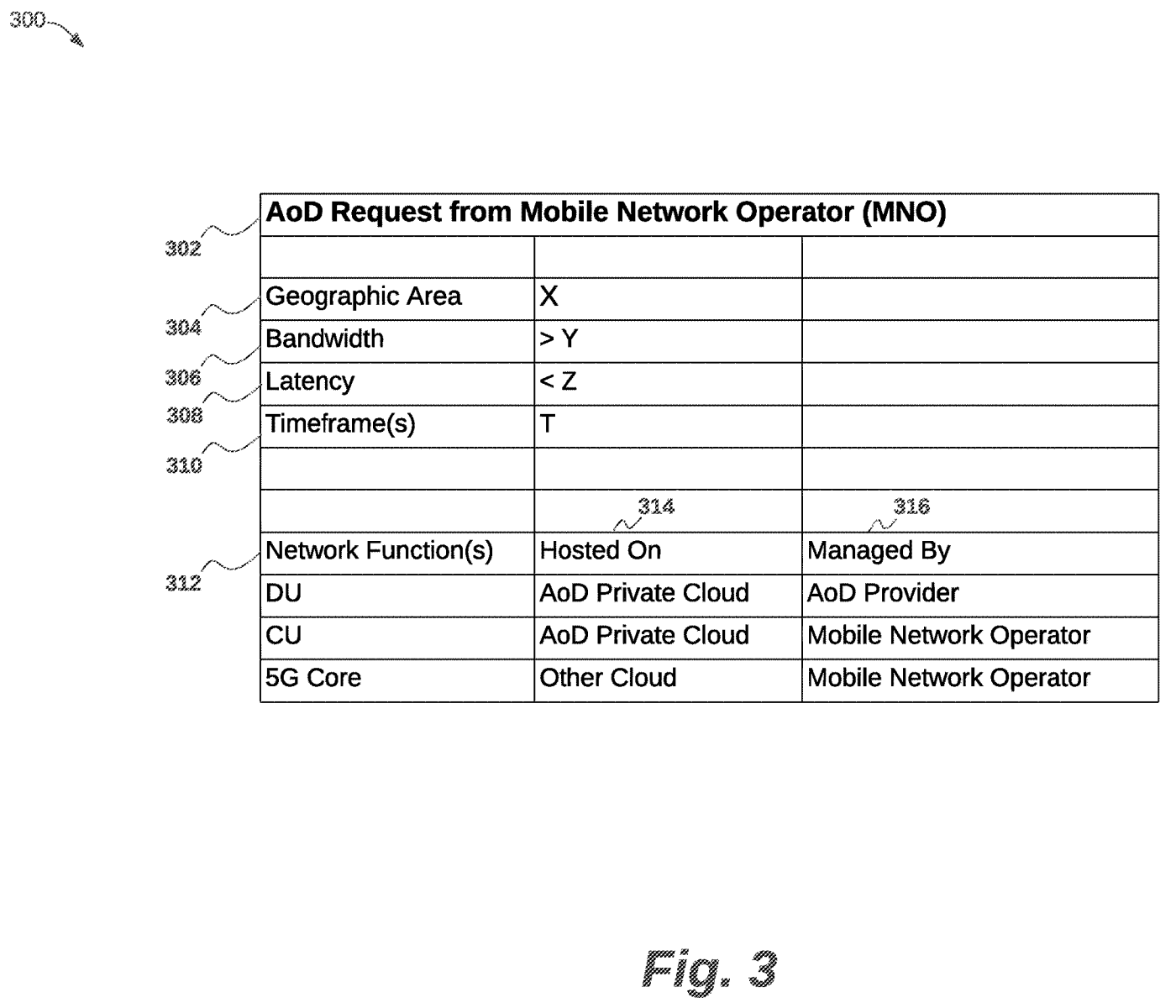

| AoD Request from Mobile Network Operator (MNO) | | |
|---|---|---|
| Geographic Area | X | |
| Bandwidth | > Y | |
| Latency | < Z | |
| Timeframe(s) | T | |
| | | |
| | _314_ | _316_ |
| Network Function(s) | Hosted On | Managed By |
| DU | AoD Private Cloud | AoD Provider |
| CU | AoD Private Cloud | Mobile Network Operator |
| 5G Core | Other Cloud | Mobile Network Operator |

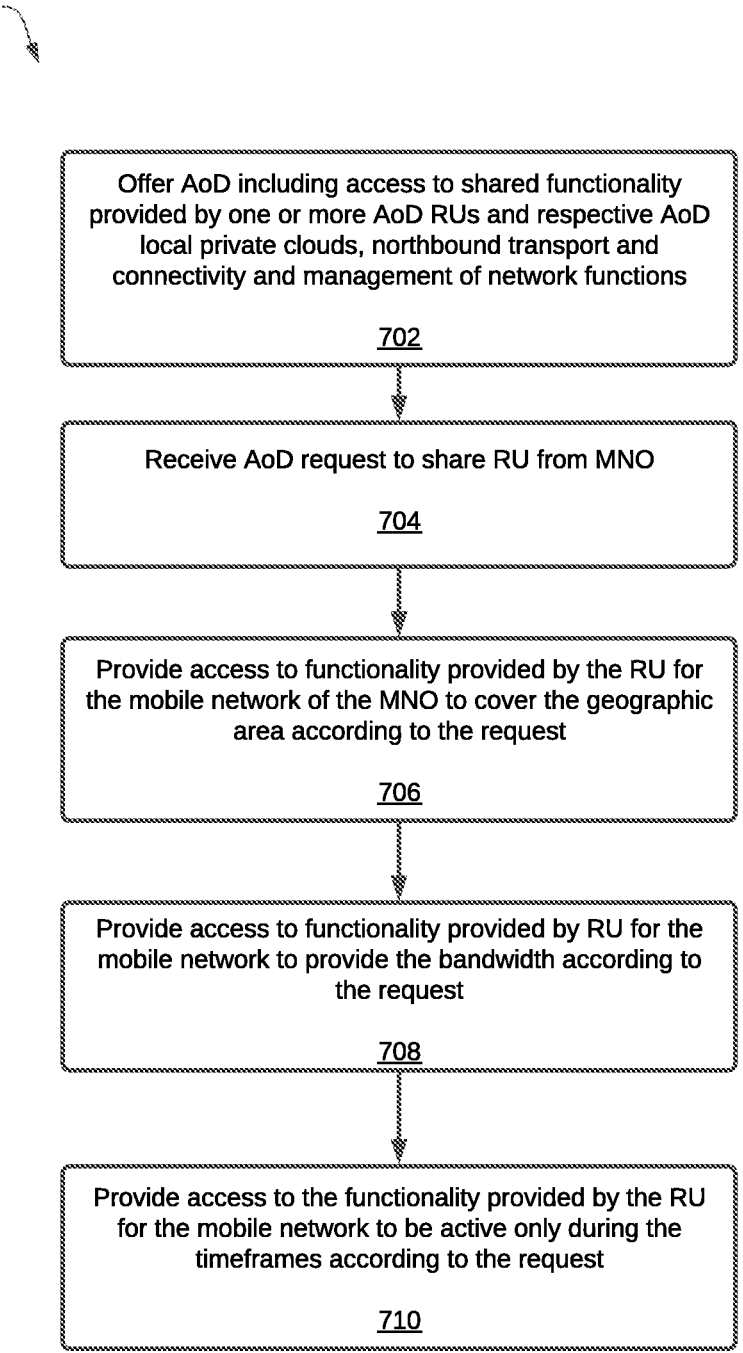

700

Offer AoD including access to shared functionality provided by one or more AoD RUs and respective AoD local private clouds, northbound transport and connectivity and management of network functions

702

Receive AoD request to share RU from MNO

704

Provide access to functionality provided by the RU for the mobile network of the MNO to cover the geographic area according to the request

706

Provide access to functionality provided by RU for the mobile network to provide the bandwidth according to the request

708

Provide access to the functionality provided by the RU for the mobile network to be active only during the timeframes according to the request

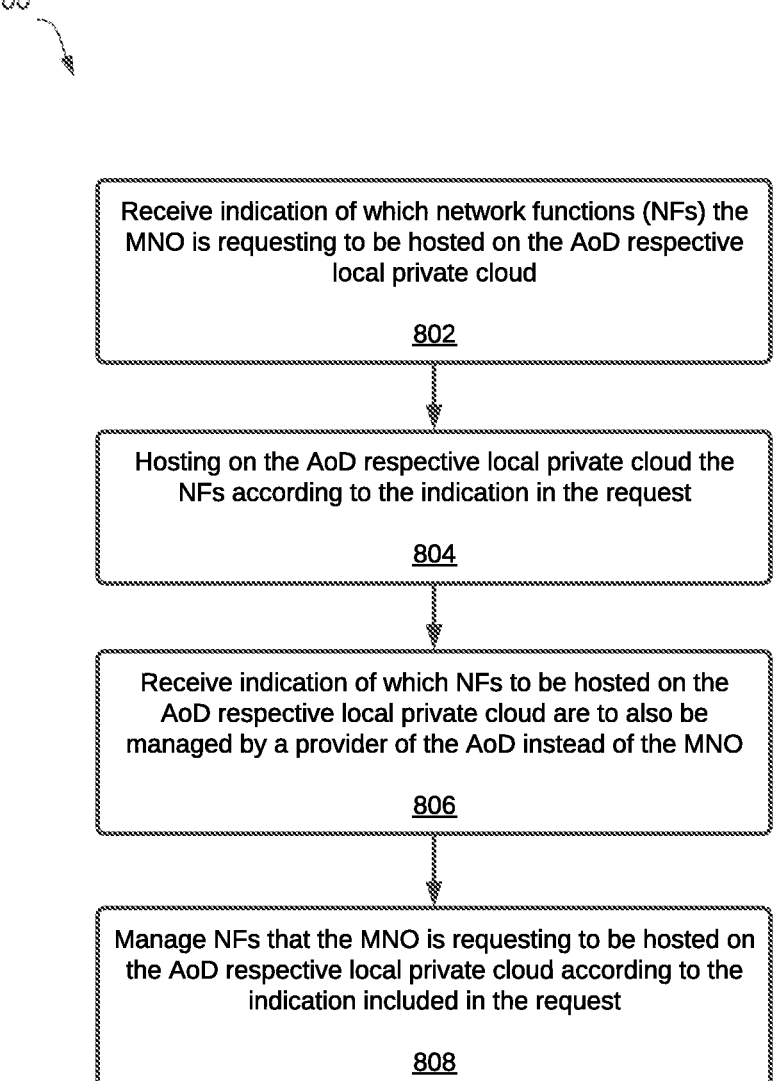

800

Receive indication of which network functions (NFs) the MNO is requesting to be hosted on the AoD respective local private cloud

802

Hosting on the AoD respective local private cloud the NFs according to the indication in the request

804

Receive indication of which NFs to be hosted on the AoD respective local private cloud are to also be managed by a provider of the AoD instead of the MNO

806

Manage NFs that the MNO is requesting to be hosted on the AoD respective local private cloud according to the indication included in the request

Provide logical connectivity between shared AoD RU and at least one NF of a mobile network of the MNO

902

Provide logical connectivity between at least one NF of a mobile network of another MNO hosted on an AoD respective local private cloud and at least one NF of the mobile network that is not hosted by the AoD respective local private cloud

904

1000

Receive an indication of quality of service (QoS) criteria, network design criteria, and network characteristics for northbound transport and connectivity

1002

Provide northbound transport and connectivity according to the indication of quality of service (QoS) criteria, the network design criteria and the network characteristics

1004

PROVIDING ACCESS ON-DEMAND TO CELLULAR WIRELESS TELECOMMUNICATION NETWORK FUNCTIONALITY

BRIEF SUMMARY

Providing access on-demand (AoD) to cellular wireless telecommunication functionality as disclosed herein develops virtualization, cloud-native, distributed, disaggregated and "as-a-service" (XaaS) attributes of cellular wireless networks to facilitate enterprise organizations building their own private Long-Term Evolution (LTE), Fifth-Generation (5G) and Sixth-Generation (6G) wireless networks. Using techniques disclosed herein, 5G and 6G mobile network operators (MNOs) may utilize public cloud providers (Platform as a Service—PaaS) and private cloud systems as platforms, network functions (NFs), including containerized network functions (CNF) and virtualized network functions (VNF), and XaaS to build their wireless networks. In an example embodiment, the AoD to cellular wireless telecommunication functionality disclosed herein offers flexible access to radio unit (RU) spectrum, infrastructure and transport as-a-service to 5G MNOs, enterprises, etc. The 5G operator or enterprise is enabled to have their own virtualized distributed unit (vDU), virtualized centralized unit (vCU) and 5G Core in the cloud. The AoD provider may provide the requested bandwidth for each enterprise based on a lease determined by the enterprise (hours, days, weeks), etc.

In various example embodiments, the AoD provider provides access on-demand to: spectrum; the RU; related radio hardware; compute and virtualization to support the vDU within an accepted latency; cloud infrastructure to support the vCU; 5G workloads and other workloads in a cloud of an enterprise's desired cloud provider; connectivity from the RU, DU, cloud providers and other locations related to the enterprise; and transport and physical links to other cloud providers that enable an enterprise to lease connectivity having specific bandwidth. The AoD provider may also provide managed services, co-managed services and self-managed services. In each such scenario, the AoD provider may provide key performance indicators (KPIs) and statistics via a multi-tenant dashboard in the enterprise's desired public or private cloud. The AoD provider may provide managed services by managing the RU, vDU, vCU, 5G workloads and other workloads of an enterprise. The AoD provider may provide co-managed services by managing the RU, vDU and vCU while providing the enterprise the ability to deploy and/or manage their own 5G workloads and other workloads. The AoD provider may provide self-managed services by managing the RU while providing the enterprise the ability to deploy and/or manage their own vDU, vCU and 5G workloads and other workloads.

In an example embodiment, an enterprise leases from the AoD provider access to RU and spectrum having specific bandwidth. The enterprise instantiates some of their NFs to reside in the AoD private cloud and other NFs in a private or public cloud provided by a could service provider of their choice. The enterprise leases their desired NFs, spectrum and transport (all as-a-service) to build their 5G network.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 illustrates an RU in a disaggregated open radio access network (RAN) architecture in accordance with embodiments described herein.

FIG. 3 is a chart illustrating example information indicated in an example AoD request in accordance with embodiments described herein.

FIG. 7 illustrates a logical flow diagram showing an example of a process for providing AoD to cellular wireless telecommunication network functionality in accordance with embodiments described herein.

FIG. 8 illustrates a logical flow diagram showing an example of a process, useful in the process of FIG. 7, for hosting and managing NFs in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
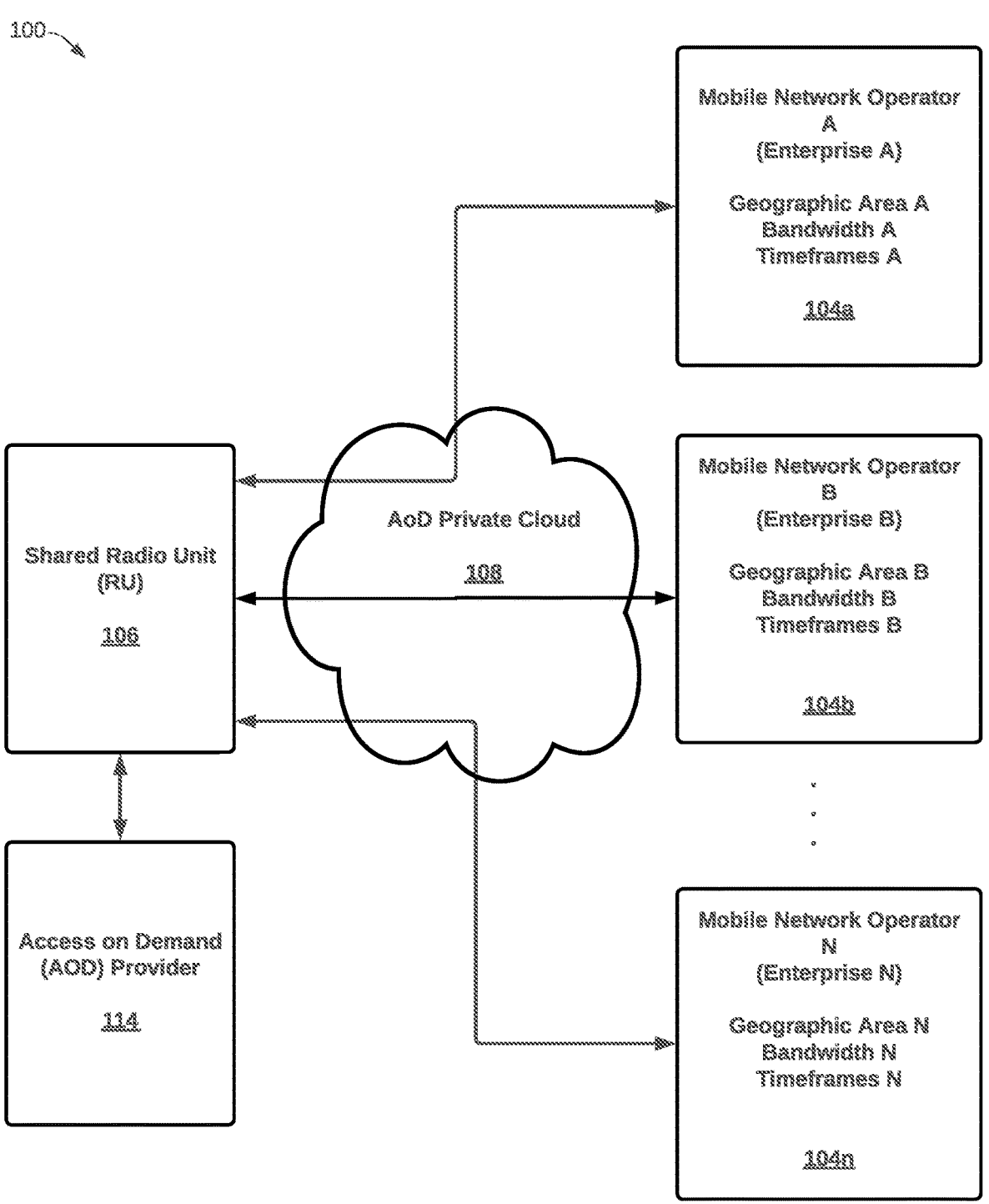
FIG. 1 illustrates an example system for providing access on demand (AoD) to cellular wireless telecommunication network functionality in accordance with embodiments described herein.

FIG. 1 illustrates an example access on-demand (AoD) system 100 for providing AoD to cellular wireless telecommunication network functionality in accordance with embodiments described herein.

The AoD system 100 includes a shared RU 106 that may be shared, on-demand, by a plurality of different mobile network operators (MNOs), for example, MNO A 104a, MNO B 104b, . . . MNO N 104n over one or more telecommunication connections. As used hereon MNOs refer to mobile service providers, private networks, businesses, government organizations, schools, colleges, other entities, other enterprises, etc., or any other person, organization, enterprise or entity that may own, operate or control a private or public wireless network of any size and for any purpose. For example, as referred to herein, the MNOs may be various different enterprises that would like to quickly stand up and operate their own private 5G wireless networks in particular geographic regions and for particular time periods, such as businesses, private organizations, public organizations, etc., but don't necessarily have the wireless spectrum, physical equipment, or other physical resources to do so. In such instances, the MNOs (e.g., MNO A 104a, MNO B 104b, . . . MNO N 104n) may lease use of such resources and access from AoD provider 114, which provides such access on-demand by offering shared use of RU 106 (and optionally other RUs), wireless transport, logical and physical telecommunication links, connectivity, optional use of AoD private cloud 108 to host wireless NFs, and management of such NFs.

In the present example, MNO A 104a is Enterprise A, MNO B 104b is Enterprise B and MNO N 104n is Enterprise N. The AoD provider 114 that is operably coupled to and controls the shared RU 106 and provides AoD private cloud 108 (e.g., is another MNO that owns the shared RU 106) offers to multiple different MNOs, such as MNO A 104a, MNO B 104b, . . . MNO N 104n use of the shared RU 106, and the radio hardware, e.g., amplifiers, filters, A/D converters, wiring, antennas, and base-station towers associated with the shared RU 106. The AoD may be customized for each MNO based on requested geographic region to be covered, requested bandwidth, timeframes needed (e.g., times of day, days of week, weeks of year, months of year, other requested time schedules, etc.), latency requirements, other quality of service (QOS) and service level agreement (SLA) requirements, requested hosting of NFs on AoD private cloud 108 and optional management of such NFs. Thus, by following an AoD model, such sharing of the shared RU and AoD private cloud 108 as described herein facilitates enterprises, such as MNO A 104a, MNO B 104b, . . . MNO N 104n, to build their own private cellular wireless telecommunication networks according to specific requested geographic area coverage, requested bandwidth, timeframes needed, latency requirements, other QoS and SLA requirements, requested hosting of NFs on AoD private cloud 108 and optional management of such NFs, without owning infrastructure, spectrum, radio hardware, etc.

FIG. 2 illustrates an example RU 206 in a disaggregated open radio access network (RAN) architecture 200 in accordance with embodiments described herein.

For example, shared RU 106 of FIG. 1 may include functionality such as that of RU 206 and operate in a disaggregated open RAN environment, such as that of RU 206 shown FIG. 2. RU 206 is operably connected to radio tower 210 of a cellular wireless telecommunication network. RU 206 provides lower physical layer (L-PHY) and radio frequency (RF) functionality for the cellular wireless telecommunication network. For example, this may include amplifying, digitizing, transmitting and receiving the RF signals associated with radio tower 210 for the cellular wireless telecommunication network.

The distributed unit (DU), which may be virtualized in the cloud 204, such as (vDU 208) provides higher physical layer (H-PHY) layer, media access control (MAC) layer, and the radio link control (RLC) layer for the wireless telecommunication network. The vDU is connected to the RU 206 via an Enhanced Common Public Radio Interface (eCPRI) connection, which is an open interface (i.e., the end point can be from different vendors).

The centralized unit (CU), which may also be virtualized in the cloud 202, such as (vCU 202) provides Packet Data Convergence Protocol (PDCP) layer, Service Data Adaptation Protocol (SDAP), and radio resource controller (RRC) functionality for the wireless telecommunication network. The vCU is connected to the vDU 208 via the fifth generation (5G) New Radio (NR) 5G NR F1 interface, which is an open interface (i.e., the end point can be from different vendors).

FIG. 3 is a chart 300 illustrating example information indicated in an example AoD request 302 in accordance with embodiments described herein.

In an example embodiment, MNO A 104a, MNO B 104b, . . . MNO N 104n of FIG. 1 may each provide a different request for access to wireless network resources from AoD provider 114 in order to build each of their respective networks according to their respective individual requirements. In various embodiments, the request 302 may represent various individual requests or other pieces of information communicated to provide such indications to the AoD provider 114. Each request may include different custom parameter values that define characteristics of the network resources to be provided to MNO A 104a, MNO B 104b, . . . MNO N.

For example, each request 302 may include indications of specific requested geographic area coverage 304, requested bandwidth 306, timeframes needed 310, latency requirements 308, other QoS and SLA requirements (not shown), requested hosting 314 of NFs 312 on AoD private cloud 108 and optional management 316 of such NFs 312 by the AoD provider 114. In the example request 302 shown in FIG. 3, an MNO has requested coverage in geographic area X (which may be indicated by zip code, address, global positioning system (GPS) coordinates, longitude and latitude coordinates, square feet, radius and/or other means of determining a geographic area). Based on the geographic area indicated, the AoD provider 114 then determines which cells, base stations and associated RUs are needed to provide such coverage for geographic area X and provides access to such RUs on-demand for the MNO to build a network covering geographic area X.

The example request 302 also indicates a requested bandwidth of greater than Y, a requested latency of less than Z and specific timeframes of T. The AoD provider 114 then provides (e.g., leases) access to the network resources needed to enable to the MNO to build the network meeting those requirements. For example, geographic area X and timeframe T may indicate that the network is requested to be active only within an area covering a particular stadium during a specific day (e.g., for a sporting event that day at the stadium). The AoD provider 114 then provides or otherwise activates access to network resources for the MNO that enable coverage at that particular stadium and only during that specific day.

The request 302 also includes an indication of which NFs 312 the MNO would like hosted on the AoD private cloud 108. For example, the AoD private cloud 108 may be implemented by hardware located at or in close proximity to the RU 106 or associated base station, for example, such that NF edge computing tasks may be performed there if desired.

The example request 302 indicates that the MNO requests that the DU and CU NFs be hosted on the AoD private cloud 108, while the 5G Core not be implemented on the AoD private cloud 108 (i.e., the 5G Core is to be hosted on another cloud service provider selected by the MNO). Also, if a particular NF is to be hosted on the AoD private cloud 108, then an option is also provided for the MNO to request that NF also be managed by the AoD provider 114 instead of being self-managed by the MNO. The request 302 indicates that the MNO requests the DU NF that is to be hosted on the AoD private cloud 108 also be managed by the AoD provider 114 instead of being self-managed by the MNO. In contrast, the request indicates the CU and 5G Core are to be self-managed by the MNO. In instances where the NF is hosted on the AoD private cloud 108, but not managed by the AoD provider 114 (as is the case with the CU in the present example), the AoD provider 114 may still transmit key performance indicators (KPIs) and statistics regarding operation of the NF via a multi-tenant dashboard in the MNO's desired public or private cloud.

Figure 4:
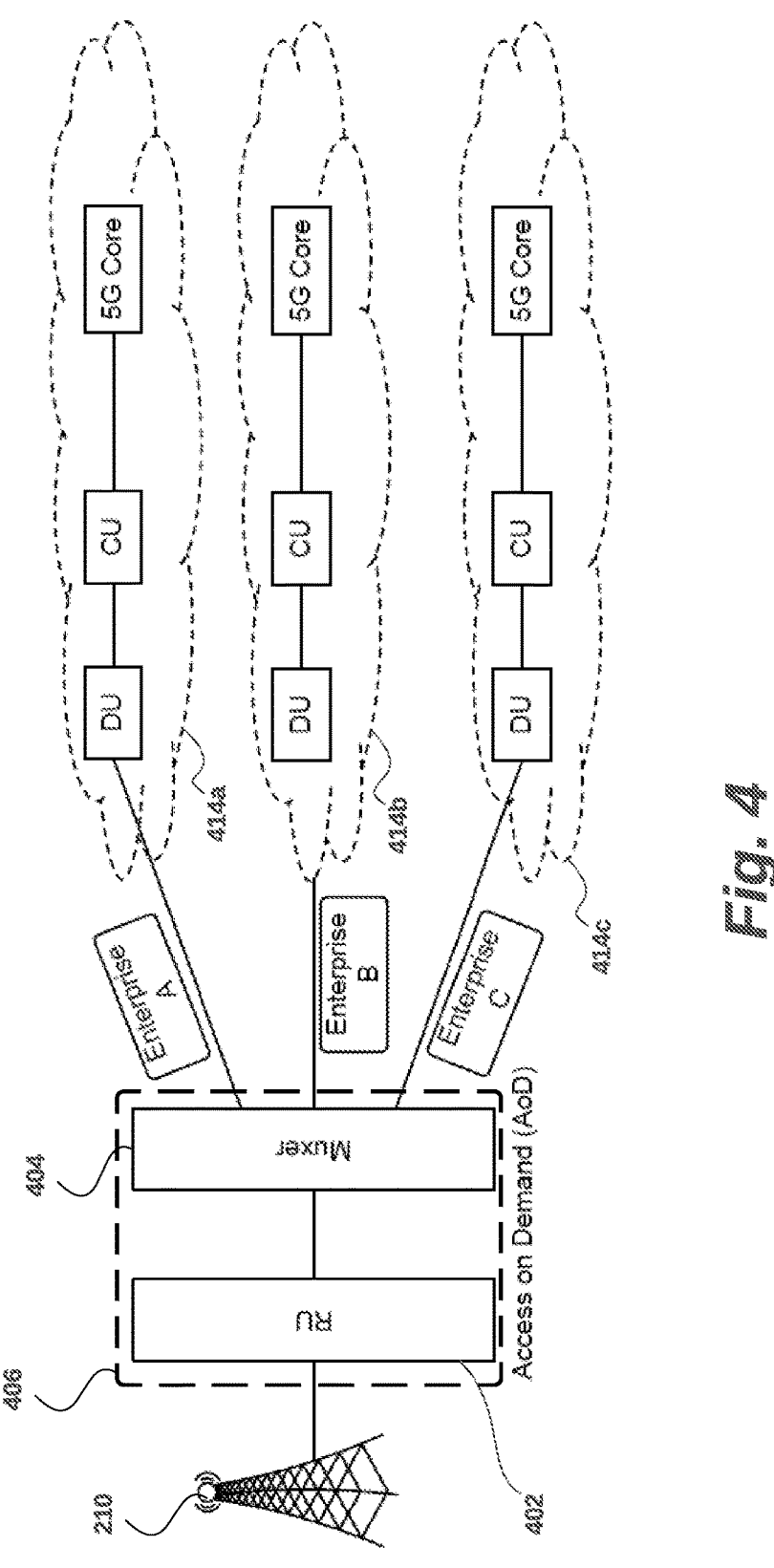
FIG. 4 illustrates a system for providing AoD to cellular wireless telecommunication network functionality including virtualized network functions (NFs) of various different MNOs hosted by public or private clouds that are not AoD private clouds associated with the AoD radio unit (RU) in accordance with embodiments described herein.

FIG. 4 illustrates a system 400 for providing AoD to cellular wireless telecommunication network functionality including virtualized NFs of various different MNOs hosted by public or private clouds that are not AoD private clouds associated with the AoD radio unit (RU) in accordance with embodiments described herein.

In an example embodiment, shared AoD RU 406 is an example of a shared RU 106 shown in FIG. 1. An AoD provider, such as AoD provider 114 shown in FIG. 1, may offer use of the AoD RU 406, and the radio hardware (e.g., amplifiers, filters, A/D converters, wiring, antennas, and base-station radio tower 210 that are part of or associated with the AD RU 406) to MNOs Enterprise A, Enterprise B and Enterprise C.

In the present example, Enterprise A, Enterprise B and Enterprise C each have their own DUs (e.g., virtualized DUs (vDUs), CUs (e.g., virtualized CUs (vCUs), and virtualized 5G NR Core/Internet Protocol (IP) Multimedia Subsystem (IMS) NFs operating in one or more clouds (which may be private clouds or public clouds) that are not AoD private clouds associated with the AoD RU 406 or AoD provider

114. Cloud computing is the on-demand availability of computer system resources, especially data storage and computing power, without direct active management by the user. Large clouds often have functions distributed over multiple locations, each of which is a data center. In particular, the present example of FIG. 4 shows: Enterprise A DU, CU and 5G Core operating in private or public cloud 414a; Enterprise B DU, CU and 5G Core operating in private or public cloud 414b; and Enterprise C DU, CU and 5G Core operating in private or public cloud 414c. According to the disaggregated model, Enterprise A, Enterprise B and Enterprise C may each select different individual vendors to provide and/or manage their respective DUs, CUS and 5G Cores.

Various network connections (e.g., Internet connections) and applicable logical telecommunication network interfaces connect: Enterprise A DUs and CUs operating in private or public cloud 414a to Enterprise A 5G Core and IMS NFs operating in private or public cloud 414a; Enterprise B DUs and CUs operating in private or public cloud 414b to Enterprise B 5G Core and IMS NFs operating in private or public cloud 414b; and Enterprise C DUs and CUs operating in private or public cloud 414c to Enterprise C 5G Core and IMS NFs operating in private or public cloud 414c. In various example embodiments, some or all of the public or private clouds of FIG. 4 may be combined into one or more clouds hosted by hardware computing devices located in one or more data centers.

Various network connections (e.g., Internet connections) and applicable logical telecommunication network interfaces (e.g., individual eCPRI interfaces) connect: Enterprise A DU operating in private or public cloud 414a to the multiplexer (muxer) 404 of AoD RU 406; Enterprise B DU operating in private or public cloud 414b to the muxer 404 of AoD RU 406; and Enterprise C DU operating in private or public cloud 414c to the muxer 404 of AoD RU 406. The muxer 404 is operably coupled to the RU 402 of AoD RU 406 in a manner that enables several input signals comprising cellular wireless telecommunication network traffic of MNOs, such as Enterprise A, Enterprise B and Enterprise C, to be able to share functionality provided by the RU 402.

In an example embodiment, the AoD RU 406 electronically apportions a spectrum made available by the RU 402 for cellular wireless telecommunication into a plurality of bandwidth portions. Such bandwidth portions are apportioned for use by the Enterprises requesting AoD. In an example embodiment, for each of Enterprise A, Enterprise B and Enterprise C, the RU 402 receives cellular wireless telecommunication network traffic between user equipment (UE) to which the particular Enterprise provides cellular wireless telecommunication service and other devices. The AoD RU 406 causes RU 402 to use a respective bandwidth portion apportioned by the shared AoD RU 406 to the particular enterprise sharing the RU 402 in order to send the cellular wireless telecommunication network traffic between the UE on the network of the particular enterprise and another device.

The enterprises, such as Enterprise A, Enterprise B and Enterprise C instantiated their NFs in the cloud and connected their DUs to the shared AoD RU 406. The shared AoD RU 406 knows the spectrum and the bandwidth allocated to each enterprise. In the present example, Enterprise A, Enterprise B and Enterprise C do not have any radio hardware, as the shared AoD RU 406 provides that ondemand. Thus, the shared AoD RU 406 facilitates Enterprise A, Enterprise B and Enterprise C to build their own respective private networks without owning infrastructure, spectrum, radio hardware, etc., by following an AoD model as described herein.

In an example embodiment, the time-division duplexing (TDD) alignment between the enterprises, such as Enterprise A, Enterprise B and Enterprise C, is provided by the shared AoD RU 406. Preferably, the enterprises should use the same timing, frequency and phase provided by shared AoD RU 406. In the present example embodiment, Enterprise A, Enterprise B and Enterprise C use the same TDD downlink/uplink (DL/UL) frame structure and DL/UL ratio. However, in other embodiments, including those with 3GPP Rel-16 RIM/CLI management, this is not necessary. The shared AoD RU 406 may be responsible for synchronization with the enterprises outside of the shared AoD RU 406 framework. In an example embodiment, carrier aggregation (CA) or dual connectivity (DC) is supported by the enterprise completely transparent to the shared AoD RU 406 or the AoD provider 114 of FIG. 1. Furthermore, due to orthogonality of DL/UL signals, the shared AoD RU 406 may in various embodiments create lower interference or no interference between the enterprises connected to it.

Figure 5:
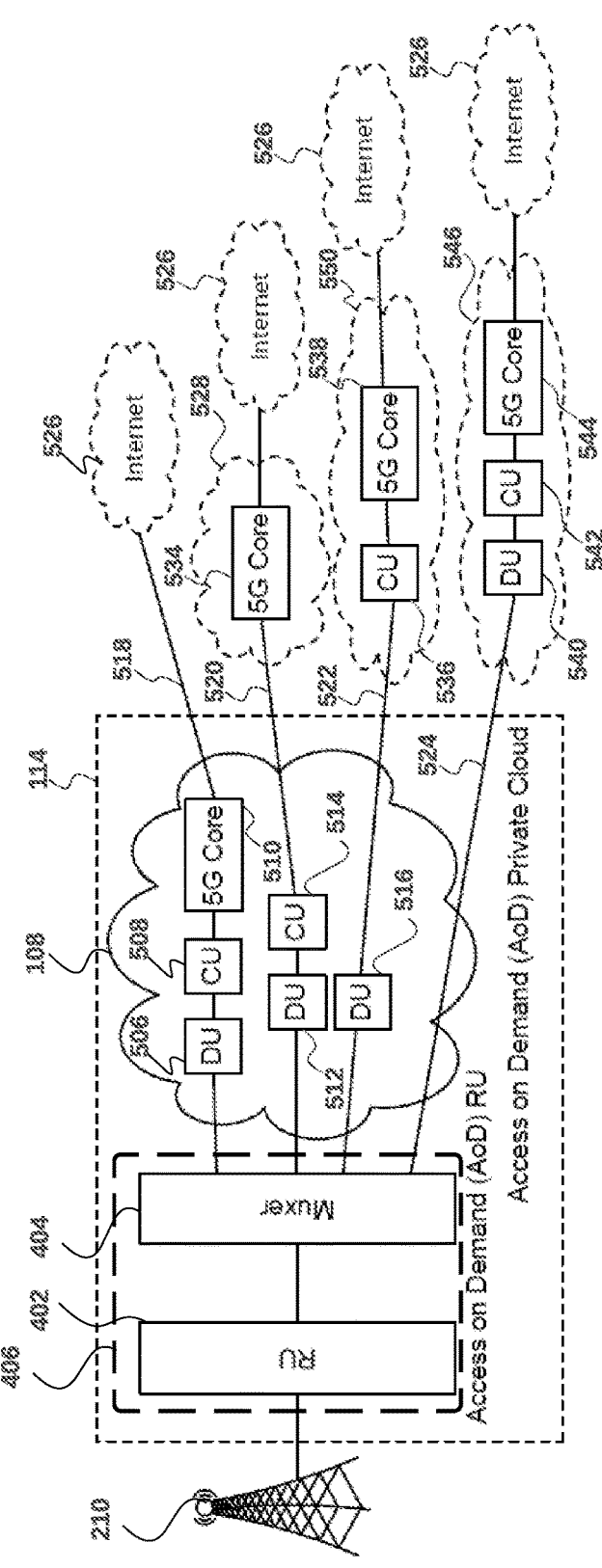
FIG. 5 illustrates a system for providing AoD to cellular wireless telecommunication network functionality including various virtualized NFs of various different MNOs hosted by an AoD private cloud associated with the AoD RU in accordance with embodiments described herein.

FIG. 5 illustrates a system 500 for providing AoD to cellular wireless telecommunication network functionality including various virtualized NFs of various different MNOs hosted by an AoD private cloud 108 associated with the AOD RU 406 in accordance with embodiments described herein.

The AoD provider 114 provides cloud infrastructure to support virtualized CU, 5G workloads and other workloads in an enterprise's desired cloud provider. The AoD provider also provides connectivity from the RU, DU of the enterprise, cloud providers and other locations related to enterprise.

For example, as shown in FIG. 5, based on an AoD request from a first enterprise, the AoD provider 114 enables the first enterprise to instantiate their DU 506, CU 508 and the User Plane Function (UPF) portion of their 5G Core network 510 in the AoD private cloud 108, while enabling the first enterprise to instantiate the 5G Core control plane (CP) function in a public or private cloud of the enterprise's choice connected to the Internet 526. The AoD provider 114 also provides wireless cellular network connectivity and transport from the User Plane Function (UPF) portion of their 5G Core network 510 to the public or private cloud of the enterprise's choice connected to the Internet 526 by providing logical connection 518.

Based on an AoD request from a second enterprise, the AoD provider 114 concurrently enables the second enterprise to instantiate their DU 512 and CU 514 in the AoD private cloud 108, while enabling the second enterprise to instantiate their 5G Core network 534 in a public or private cloud 528 of the second enterprise's choice connected to the Internet 526. The AoD provider 114 also provides wireless cellular network connectivity and transport from the second enterprise's CU 514 to the second enterprise's 5G Core network 534 by providing logical connection 520.

Based on an AoD request from a third enterprise, the AoD provider 114 concurrently enables the third enterprise to instantiate their DU 516 in the AoD private cloud 108, while enabling the third enterprise to instantiate their CU 536 and 5G Core network 538 in a public or private cloud 550 of the third enterprise's choice connected to the Internet 526. The AoD provider 114 also provides wireless cellular network connectivity and transport from the third enterprise's DU 516 to the third enterprise's CU 536 by providing logical connection 522.

Based on an AoD request from a fourth enterprise, the AoD provider 114 concurrently enables the fourth enterprise to instantiate their DU 540, CU 542 and 5G Core network 544 in a public or private cloud 546 of the fourth enterprise's choice connected to the Internet 526. The AoD provider 114 also provides wireless cellular network connectivity and transport from the muxer 404 to the fourth enterprise's DU 540 by providing logical connection 524. In an example embodiment, the AoD architecture of the system 500 provides connectivity and transport to cloud providers of cloud 528, cloud 550 and cloud 546 on which network functions of the enterprise may instead be hosted. An enterprise can then use this transport network dictating their bandwidth and latency for a duration of time set by the enterprise.

Various other configurations of which NFs are hosted by the AoD private cloud 108 versus another public or private cloud of the enterprise's choice for a particular enterprise are also enabled by the AoD provider 114 based on the request and requirements of the particular enterprise. Thus, such the AoD provider 114 provides flexibility for the particular enterprise to build and operate their network according to the various requirements of the particular enterprise.

Figure 6:
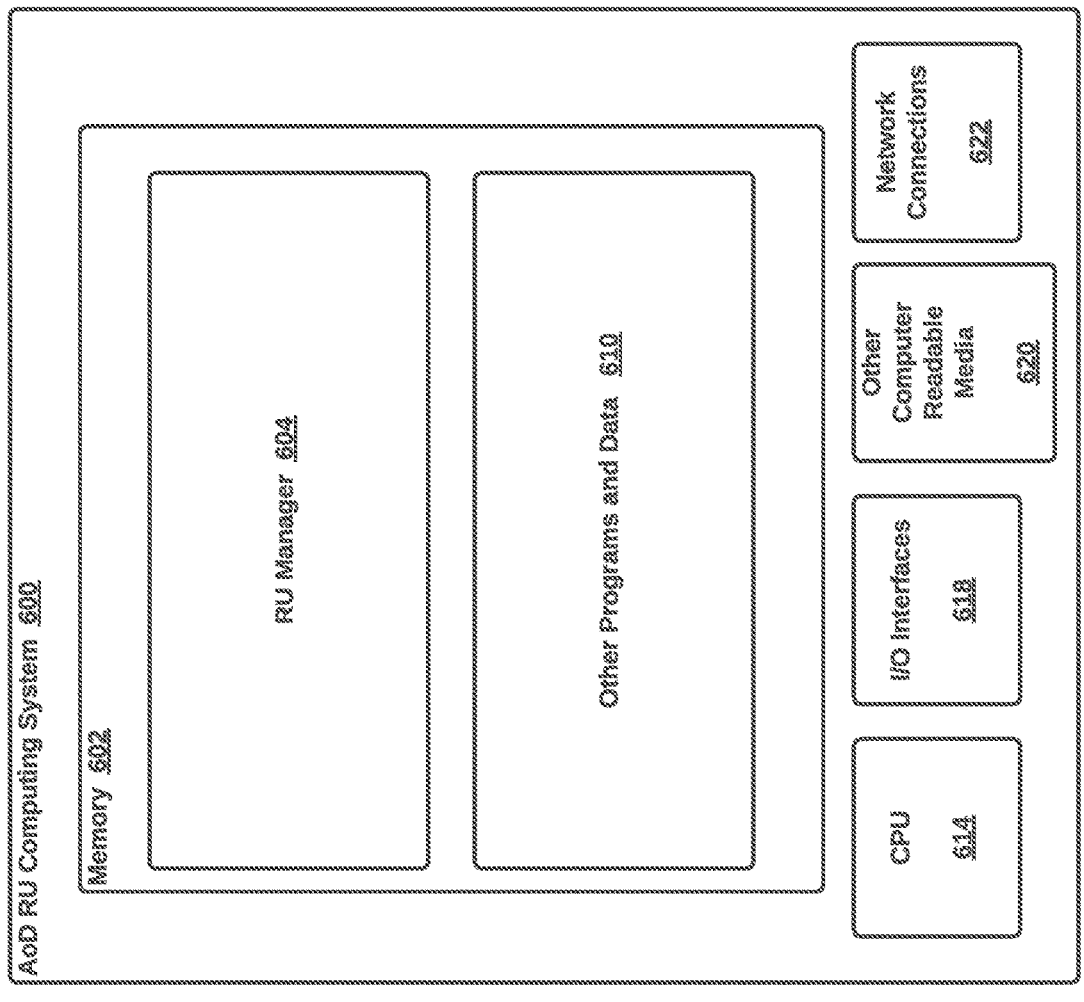
FIG. 6 shows a system diagram that illustrates an example of an AoD RU computing system for implementing providing AoD to cellular wireless telecommunication network functionality, in accordance with embodiments described herein.

FIG. 6 shows a system diagram that illustrates an example of an AoD RU computing system 600 for implementing providing AoD to cellular wireless telecommunication network functionality, in accordance with embodiments described herein.

In various embodiments, the control systems of the shared RU 106 of FIG. 1, shared AoD RU 406 of FIG. 4 and/or AoD provider 114 of FIG. 1 and FIG. 5 can be implemented either as a network elements on dedicated hardware, as a software instance running on dedicated hardware, or as a virtualized function instantiated on an appropriate platform, e.g., a cloud infrastructure. In some embodiments, many operations and functionality of such systems may be completely software-based and designed as cloud-native, meaning that they're agnostic to the underlying cloud infrastructure, allowing higher deployment agility and flexibility. However, FIG. 6 illustrates an example of underlying hardware on which systems of the shared RU 106 of FIG. 1, shared AoD RU 406 of FIG. 4 and/or AoD provider 114 of FIG. 1 and FIG. 5, may be implemented. For example, systems of the shared RU 106 may be implemented using AoD RU computing system 600. In some embodiments, one or more special-purpose computing systems may be used to implement systems of the shared RU 106. Accordingly, various embodiments described herein may be implemented in software, hardware, firmware, or in some combination thereof. AoD RU computing system 600 may include memory 602, one or more central processing units (CPUs) 614, I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon access RU manager 604. The RU manager 604 is configured to implement and/or perform various control functions to implement operations of the shared RU 106 of FIG. 1, shared AoD RU 406 of FIG. 4 and/or AoD provider 114 of FIG. 1 and FIG. 5 described herein. Memory 602 may also store other programs and data 610, which may include control systems for L-PHY and RF functionality for the cellular wireless telecommunication network, control systems for amplifying, digitizing, transmitting and receiving the RF signals associated with radio tower 210 for the cellular wireless telecommunication network, performance statistics, network interference management and statistics, quality of service management and statistics, throughput statistics, databases, user interfaces, operating systems, other network management functions, other NFs, etc.

Network connections 622 are configured to communicate with other computing devices, telecommunication equipment, computer network equipment and/or radio antennas, to perform operations of providing AoD to cellular wireless telecommunication network functionality. In various embodiments, the network connections 622 may include transmitters and receivers to send and receive data as described herein; hardware that implements systems for L-PHY and RF functionality for the cellular wireless telecommunication network; hardware that implements systems for amplifying, digitizing, transmitting and receiving the RF signals associated with radio tower 210 for the cellular wireless telecommunication network; radio hardware including one or more amplifiers, filters, analog-to-digital (A/D) converters, wiring, antennas and base-station towers and/or interfaces thereto; etc.

I/O interfaces 618 may include video interfaces, other data input or output interfaces, or the like. In some embodiments, I/O interfaces 618 may include transmitters and receivers to send and receive data as described herein; hardware that implements systems for L-PHY and RF functionality for the cellular wireless telecommunication network; hardware that implements systems for amplifying, digitizing, transmitting and receiving the RF signals associated with radio tower 210 for the cellular wireless telecommunication network; radio hardware including one or more amplifiers, filters, analog-to-digital (A/D) converters, wiring, antennas and base-station towers and/or interfaces thereto; etc.

Other computer-readable media 620 may include other types of stationary or removable computer-readable media, such as removable flash drives, external hard drives, or the like.

In some embodiments, one or more special-purpose computing systems may be used to implement systems of the RU manager 604. Accordingly, various embodiments described herein may be implemented in software, hardware, firmware, or in some combination thereof.

FIG. 7 illustrates a logical flow diagram showing an example of a process 700 for providing AoD to cellular wireless telecommunication network functionality in accordance with embodiments described herein.

At 702, the system 100 electronically offers access on-demand (AoD) including access to shared functionality provided by one or more AoD cellular wireless telecommunication network radio unit (RUs) and respective AoD local private clouds associated with the one or more RUs for multiple different mobile network operators to be able to concurrently share the functionality provided by the one or more RUs and the respective local private clouds. The electronically offering AoD also includes northbound transport and connectivity, and management of network functions.

At 704, the system 100 receives an AoD request to share the one or more RUs from each mobile network operator of a plurality of different mobile network operators. In an example embodiment, the AoD request may include an indication of a geographic area the mobile network operator is requesting be covered with a mobile network of the mobile network operator using the AoD; an indication of bandwidth the mobile network operator is requesting to be provided by the mobile network of the mobile network operator using the AoD; and an indication of one or more timeframes the mobile network operator is requesting the mobile network of the mobile network operator using the AoD be active.

At 706, the system 100 electronically provides access to the functionality provided by the one or more RUs for the mobile network of the mobile network operator to cover the geographic area according to the indication of the geographic area included in the AoD request.

At 708, the system 100 electronically provides access to the functionality provided by the one or more RUs for the mobile network of the mobile network operator to provide the bandwidth according to the indication of the bandwidth included in the AoD request.

At 710, the system 100 electronically provides access to the functionality provided by the one or more RUs for the mobile network of the mobile network operator to be active only during the one or more timeframes according to the indication of the one or more timeframes included in the AoD request. The system 100 may perform the 704, 706, 708 and 710 for r each received AoD request from each mobile network operator of a plurality of different mobile network operators.

In an example embodiment, each AoD request further includes an indication of maximum latency the mobile network operator is requesting the mobile network of the mobile network operator using the AoD be provided. For each received AoD request, the system 100 then electronically provides the maximum latency for the mobile network of the mobile network operator using the AoD according to the indication of maximum latency included in the AoD request.

FIG. 8 illustrates a logical flow diagram showing an example of a process 800, useful in the process of FIG. 7, for hosting and managing NFs in accordance with embodiments described herein.

At 802, the system 100 receives an indication of which network functions (NFs) of the mobile network operator using the AoD the mobile network operator is requesting to be hosted on a respective local private cloud associated with an RU shared by the mobile network operator.

At 804, the system 100 hosts on the AoD respective local private cloud the NFs according to the indication in the request. In particular, the system 100 electronically provides access to functionality provided by the respective local private cloud associated with the RU shared by the mobile network operator for NFs of the mobile network operator to be hosted on the respective local private cloud according to the indication included in the AoD request of which NFs the mobile network operator is requesting to be hosted on the respective local private cloud.

At 806, the system 100 receives an indication of which NFs of the mobile network operator that the mobile network operator is requesting to be hosted on the respective local private cloud associated with the RU and to also be managed by a provider of the AoD instead of the mobile network operator.

At 808, the system 100 manages NFs that the MNO is requesting to be hosted on the AoD respective local private cloud according to the indication included in the request. In particular, the system 100, for each received AoD request, electronically manages NFs that the mobile network operator using the AoD is requesting to be hosted on the respective local private cloud according to the indication included in the request of which NFs the mobile network operator is requesting to also be managed by a provider of the AoD instead of by the mobile network operator.

Figure 9:
FIG. 9 illustrates a logical flow diagram showing an example of a process for providing logical connectivity to NFs of MNOs sharing an AoD RU in accordance with embodiments described herein.

FIG. 9 illustrates a logical flow diagram showing an example of a process 900 for providing logical connectivity to NFs of MNOs sharing an AoD RU in accordance with embodiments described herein.

At 902, the system 100 provides logical connectivity between the one or more RUs that provide the shared functionality and at least one network function, of the mobile network of the mobile network operator, that is not hosted by any of the respective local private clouds.

At 904, the system 100 provides logical connectivity between at least one network function of the mobile network hosted on a respective local private cloud associated with an RU of the one or more RUs and at least one network function, of the mobile network, that is not hosted by any of the respective local private clouds.

Figure 10:
FIG. 10 illustrates a logical flow diagram showing an example of a process for an AoD system providing northbound transport and connectivity in accordance with embodiments described herein.

FIG. 10 illustrates a logical flow diagram showing an example of a process 1000 for an AoD system providing northbound transport and connectivity in accordance with embodiments described herein. For example, process 1000 may be useful in process 700 for providing AoD to cellular wireless telecommunication network and in related process 900 for providing logical connectivity to NFs of MNOs sharing an AoD RU.

At 1002, the system 100 receives an indication of quality of service (QOS) criteria, network design criteria, and network characteristics for northbound transport and connectivity. For example, such an indication may be included in an AoD request from an enterprise that would like to quickly stand up and operate their own private 5G wireless network in particular geographic region and for a particular time period, but doesn't necessarily have the wireless spectrum, physical equipment, or other physical resources to do so.

At 1004, the system 100 electronically provides northbound transport and connectivity according to the indication of quality of service (QOS) criteria, the network design criteria and the network characteristics. Such may be performed simultaneously or concurrently for each received AoD request from multiple different enterprises. In various example embodiments, the QoS criteria may include criteria regarding one or more of: bandwidth, priority, delay, jitter and other criteria. The network design criteria may include criteria regarding one or more of: virtual LAN (VLAN) characteristics, virtual routing and forwarding (VRF), virtual private network (VPN) characteristics, network tunneling and other criteria. The network characteristics may include one or more of: Layer 2 (L2), Layer 3 (L3) characteristics and other characteristics.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:

a memory that stores computer-executable instructions; and at least one processor that executes the computer-executable instructions to perform actions, the actions including:

electronically offering access on demand (AoD) including access to shared functionality provided by one or more AoD cellular wireless telecommunication network radio units (RUs) and respective AoD local private clouds associated with the one or more RUs, northbound transport and connectivity, and management of network functions for multiple different mobile network operators to be able to concurrently share the functionality provided by the one or more RUs and the respective local private clouds, receive northbound transport and connectivity, and receive management of network functions;

receiving an AoD request to share the one or more RUs from each mobile network operator of a plurality of different mobile network operators, wherein each AoD request includes:

an indication of a geographic area the mobile network operator is requesting be covered with a mobile network of the mobile network operator using the AoD;

an indication of bandwidth the mobile network operator is requesting to be provided by the mobile network of the mobile network operator using the AoD; and an indication of one or more timeframes the mobile network operator is requesting the mobile network of the mobile network operator using the AoD be active; and for each received AoD request, in response to the AoD request:

electronically providing access to the functionality provided by the one or more RUs for the mobile network of the mobile network operator to cover the geographic area according to the indication of the geographic area included in the AoD request;

electronically providing access to the functionality provided by the one or more RUs for the mobile network of the mobile network operator to provide the bandwidth according to the indication of the bandwidth included in the AD request; and electronically providing access to the functionality provided by the one or more RUs for the mobile network of the mobile network operator to be active only during the one or more timeframes according to the indication of the one or more timeframes included in the AoD request;

wherein:

the indication of the geographic area indicates a zip code, address, global positioning system (GPS) coordinates, or latitude and longitude coordinates;

each AoD request further includes an indication of which network functions (NFs) of the mobile network operator that the mobile network operator is requesting to be hosted on a respective local private cloud associated with the one or more RUs and to also be managed by a provider of the AoD instead of the mobile network operator; and the actions further include:

for each received AoD request, electronically managing NFs that the mobile network operator using the AoD is requesting to be hosted on the respective local private cloud according to the indication included in the AoD request of which NFs the mobile network operator is requesting to be hosted on the respective local private cloud and to also be managed by the provider of the AoD instead of by the mobile network operator; and for each received AoD request, electronically providing at least one of:

logical connectivity between the one or more RUs that provide the shared functionality and at least one network function, of the mobile network of the mobile network operator, that is not hosted by any of the respective local private clouds; and logical connectivity between at least one network function of the mobile network hosted on a respective local private cloud associated with an RU of the one or more RUs and at least one network function, of the mobile network, that is not hosted by any of the respective local private clouds.

2. The system of claim 1 wherein:

each AoD request further includes:

an indication of quality of service (QoS) criteria, network design criteria, and network characteristics for northbound transport and connectivity; and the actions further include:

for each received AoD request, electronically providing northbound transport and connectivity according to the indication of the quality of service (QoS) criteria, the network design criteria and the network characteristics.

3. The system of claim 2 wherein:

the QoS criteria includes criteria regarding one or more of bandwidth, priority, delay, and jitter;

the network design criteria includes criteria regarding one or more of virtual LAN (VLAN) characteristics, virtual routing and forwarding (VRF), virtual private network (VPN) characteristics and network tunneling; and the network characteristics include one or more of Layer 2 (L2) and Layer 3 (L3) characteristics.

4. The system of claim 1 wherein each AoD request further includes:

an indication of maximum latency the mobile network operator is requesting the mobile network of the mobile network operator using the AoD be provided.

5. The system of claim 4 wherein the actions further include:

for each received AoD request, electronically providing the maximum latency for the mobile network of the mobile network operator using the AoD according to the indication of maximum latency included in the AoD request.

6. A method comprising:

electronically offering access on demand (AoD) including access to shared functionality provided by one or more AoD cellular wireless telecommunication network radio units (RUs) and respective AoD local private clouds associated with the one or more RUs, northbound transport and connectivity, and management of network functions for multiple different mobile network operators to be able to concurrently share the functionality provided by the one or more RUs and the respective local private clouds, receive northbound transport and connectivity, and receive management of network functions;

receiving an AoD request to share the one or more RUs from each mobile network operator of a plurality of different mobile network operators, wherein each AoD request includes:

an indication of a geographic area the mobile network operator is requesting be covered with a mobile network of the mobile network operator using the AoD;

an indication of bandwidth the mobile network operator is requesting to be provided by the mobile network of the mobile network operator using the AoD; and an indication of one or more timeframes the mobile network operator is requesting the mobile network of the mobile network operator using the AoD be active; and for each received AoD request, in response to the AoD request:

electronically providing access to the functionality provided by the one or more RUs for the mobile network of the mobile network operator to cover the geographic area according to the indication of the geographic area included in the AoD request;

electronically providing access to the functionality provided by the one or more RUs for the mobile network of the mobile network operator to provide the bandwidth according to the indication of the bandwidth included in the AoD request; and electronically providing access to the functionality provided by the one or more RUs for the mobile network of the mobile network operator to be active only during the one or more timeframes according to the indication of the one or more timeframes included in the AoD request;

wherein:

the indication of the geographic area indicates a zip code, address, global positioning system (GPS) coordinates, or latitude and longitude coordinates;

each AoD request further includes an indication of which network functions (NFs) of the mobile network operator that the mobile network operator is requesting to be hosted on a respective local private cloud associated with the one or more RUs and to also be managed by a provider of the AoD instead of the mobile network operator; and the method further comprises:

for each received AoD request, electronically managing NFs that the mobile network operator using the AoD is requesting to be hosted on the respective local private cloud according to the indication included in the AoD request of which NFs the mobile network operator is requesting to be hosted on the respective local private cloud and to also be managed by the provider of the AoD instead of by the mobile network operator; and for each received AoD request, electronically providing at least one of:

logical connectivity between the one or more RUs that provide the shared functionality and at least one network function, of the mobile network of the mobile network operator, that is not hosted by any of the respective local private clouds; and logical connectivity between at least one network function of the mobile network hosted on a respective local private cloud associated with an RU of the one or more RUs and at least one network function, of the mobile network, that is not hosted by any of the respective local private clouds.

7. The method of claim 6 wherein:

each AoD request further includes:

an indication of quality of service (QoS) criteria, network design criteria, and network characteristics for northbound transport and connectivity; and the method further includes:

for each received AoD request, electronically providing northbound transport and connectivity according to the indication of the quality of service (QoS) criteria, network design criteria, and network characteristics.

8. The method of claim 7, wherein:

the QoS criteria includes criteria regarding one or more of bandwidth, priority, delay, and jitter;

the network design criteria includes criteria regarding one or more of virtual LAN (VLAN) characteristics, virtual routing and forwarding (VRF), virtual private network (VPN) characteristics and network tunneling; and the network characteristics include one or more of Layer 2 (L2) and Layer 3 (L3) characteristics.

9. The method of claim 6 wherein each AoD request further includes:

an indication of maximum latency the mobile network operator is requesting the mobile network of the mobile network operator using the AoD be provided.

10. A non-transitory computer-readable storage medium having computer-executable instructions stored thereon that, when executed by at least one processor, cause actions to be performed, the actions including:

electronically offering access on demand (AoD) including access to shared functionality provided by one or more AoD cellular wireless telecommunication network radio units (RUs) and respective AoD local private clouds associated with the one or more RUs, northbound transport and connectivity, and management of network functions for multiple different mobile network operators to be able to concurrently share the functionality provided by the one or more RUs and the respective local private clouds, receive northbound transport and connectivity, and receive management of network functions;

receiving an AoD request to share the one or more RUs from each mobile network operator of a plurality of different mobile network operators, wherein each AoD request includes:

an indication of a geographic area the mobile network operator is requesting be covered with a mobile network of the mobile network operator using the AoD;

an indication of bandwidth the mobile network operator is requesting to be provided by the mobile network of the mobile network operator using the AoD; and an indication of one or more timeframes the mobile network operator is requesting the mobile network of the mobile network operator using the AoD be active; and for each received AoD request, in response to the AoD request:

electronically providing access to the functionality provided by the one or more RUs for the mobile network of the mobile network operator to cover the geographic area according to the indication of the geographic area included in the AoD request;

electronically providing access to the functionality provided by the one or more RUs for the mobile network of the mobile network operator to provide the bandwidth according to the indication of the bandwidth included in the AoD request; and electronically providing access to the functionality provided by the one or more RUs for the mobile network of the mobile network operator to be active only during the one or more timeframes according to the indication of the one or more timeframes included in the AoD request;

wherein:

the indication of the geographic area indicates a zip code, address, global positioning system (GPS) coordinates, or latitude and longitude coordinates;

each AoD request further includes an indication of which network functions (NFs) of the mobile network operator that the mobile network operator is requesting to be hosted on a respective local private cloud associated with the one or more RUs and to also be managed by a provider of the AoD instead of the mobile network operator; and the actions further include:

for each received AoD request, electronically managing NFs that the mobile network operator using the AoD is requesting to be hosted on the respective local private cloud according to the indication included in the AoD request of which NFs the mobile network operator is requesting to be hosted on the respective local private cloud and to also be managed by the provider of the AoD instead of by the mobile network operator; and for each received AoD request, electronically providing at least one of:

logical connectivity between the one or more RUs that provide the shared functionality and at least one network function, of the mobile network of the mobile network operator, that is not hosted by any of the respective local private clouds; and logical connectivity between at least one network function of the mobile network hosted on a respective local private cloud associated with an RU of the one or more RUs and at least one network function, of the mobile network, that is not hosted by any of the respective local private clouds.

11. The non-transitory computer-readable storage medium of claim 10 wherein:

each AoD request further includes:

an indication of quality of service (QoS) criteria, network design criteria, and network characteristics for northbound transport and connectivity; and the actions further include:

for each received AoD request, electronically providing northbound transport and connectivity according to the indication of the quality of service (QoS) criteria, the network design criteria and the network characteristics.

12. The non-transitory computer-readable storage medium of claim 11, wherein:

the QoS criteria includes criteria regarding one or more of bandwidth, priority, delay, and jitter;

the network design criteria includes criteria regarding one or more of virtual LAN (VLAN) characteristics, virtual routing and forwarding (VRF), virtual private network (VPN) characteristics and network tunneling; and the network characteristics include one or more of Layer 2 (L2) and Layer 3 (L3) characteristics.

13. The non-transitory computer-readable storage medium of claim 10 wherein each AoD request further includes:

an indication of maximum latency the mobile network operator is requesting the mobile network of the mobile network operator using the AoD be provided.

\* \* \* \* \*